United States Patent
Kaps et al.

(10) Patent No.: US 9,592,514 B2
(45) Date of Patent: Mar. 14, 2017

(54) PRESS-GRANULATING PROCESS OF NON-DUCTILE SALTS

(71) Applicants: Stephan Kaps, Bad Frankenhausen (DE); Heinz Scherzberg, Sondershausen (DE); Barbara Heuchel, Sondershausen (DE)

(72) Inventors: Stephan Kaps, Bad Frankenhausen (DE); Heinz Scherzberg, Sondershausen (DE); Barbara Heuchel, Sondershausen (DE)

(73) Assignee: K-UTEC AG SALT TECHNOLOGIES, Sondershausen (DE)

( * ) Notice: Subject to any disclaimer, the term of this patent is extended or adjusted under 35 U.S.C. 154(b) by 150 days.

(21) Appl. No.: 14/208,475

(22) Filed: Mar. 13, 2014

(65) Prior Publication Data
US 2014/0346260 A1 Nov. 27, 2014

(30) Foreign Application Priority Data

Mar. 15, 2013 (DE) .................. 10 2013 004 597

(51) Int. Cl.
*B02C 23/12* (2006.01)
*B01J 2/22* (2006.01)
*C05D 1/00* (2006.01)
*C05D 1/04* (2006.01)
*C05G 3/00* (2006.01)

(52) U.S. Cl.
CPC ............... *B02C 23/12* (2013.01); *B01J 2/22* (2013.01); *C05D 1/005* (2013.01); *C05D 1/04* (2013.01); *C05G 3/0058* (2013.01)

(58) Field of Classification Search
CPC ..... B02C 23/12; B02C 19/00; B02C 19/0056; C05G 3/0058; C05D 1/04; C05D 1/005; B01J 2/22
USPC ................................................ 241/30, 24.1
See application file for complete search history.

(56) References Cited

FOREIGN PATENT DOCUMENTS

| DE | 3148404 A1 | * | 6/1983 | ............... C01F 5/40 |
| DE | 4303984 C1 | * | 3/1994 | ............... C01F 5/40 |
| JP | 01270583 A | * | 10/1989 | |

* cited by examiner

*Primary Examiner* — Mark Rosenbaum
(74) *Attorney, Agent, or Firm* — Flynn, Thiel, Boutell & Tanis, P.C.

(57) ABSTRACT

Process of press-granulating non-ductile salts and salt mixtures, such as kieserite ($MgSO_4 \cdot H_2O$), langbeinite ($K_2SO_4 \cdot 2MgSO_4$), polyhalide ($K_2SO_4 \cdot MgSO_4 \cdot 2CaSO_4 \cdot 2H_2O$), arcanite ($K_2SO_4$) and anhydrite ($CaSO_4$) for preparing stable, storable granulate, by pressing a mixture of fine grains of salt and a viscous, sugar-containing additive, such as molasses having a total sugar content in the dry matter of from 47 to 55%, by roller pressing at pressures up to 260 bar. The press scraps initially obtained, which are ductile, are solidified by maturing of the material at temperatures between 20 and 40° C. and maturing times of 3 to 8 hours prior to crushing them in impact mills and sieving.

8 Claims, 3 Drawing Sheets

PRESS-GRANULATING PROCESS OF NON-DUCTILE SALTS

FIELD OF THE INVENTION

The invention relates to a process of press-granulating non-ductile salts and salt mixtures, especially sulfate-type mineral salts, such as kieserite ($MgSO_4 \cdot H_2O$), langbeinite ($K_2SO_4 \cdot 2MgSO_4$), polyhalite ($K_2SO_4 \cdot MgSO_4 \cdot 2CaSO_4 \cdot 2H_2O$) or arcanite ($K_2SO_4$) or mixtures of these salts. These compounds represent valuable potassium-sulfur or potassium-magnesium-sulfur fertilizers being free of chloride, which can be gained via mining or from crystallized potassium containing raw salts of polymineralic compositions, and which can be used as polynutrient fertilizers following respective granulation via press-pelletizing. Said fertilizers gain more and more interest since they are free of chloride, and thus counteract the ground salinization in arid climate or in irrigation cultures, and provide potassium and further nutrients, such as magnesium and sulfur, partially also calcium, in plant-available form.

BACKGROUND OF THE INVENTION

The granulation of potassium fertilizers of potassium chloride via press-granulation is a worldwide preferred procedure in order to provide granules with grain sizes between 1 to 5 mm from fine grained crystallizates or flotation concentrates. These granules can be spread mechanically and provide the desired spread pattern when spilled.

The process of press-granulating of potassium chloride and other chloride-containing salts generally functions without granulate auxiliaries, i.e. is free of binders. In the press-granulating process, the dried hot fine salt together with salt return (undersized grain) is provided to a roller press via a stuffing screw, and is compacted via counter-rotating, usually profiled, rollers under high pressure to a foil consisting of compacted salt (scraps). The foil exiting the roller press is separated from the non-pressed salt and is crushed in an impact mill or a hammer mill. The crushed material is separated using an oscillating sieve into coarse grain (oversized material), product (medium grain) and fine product (undersized grain). Coarse grain is further crushed, and undersized grain together with fresh salt is provided to the roller press again. Said process results in the desired product grain size, preferably from 1 to 4 or from 2 to 5 mm.

Said process has been successfully used for chloride-containing salts, but does not work for salts which are difficult to press, especially sulfate-containing salts, since the compacting using a roller press requires a certain ductility and fluidity of the salts under high pressure, which is true for potassium chloride and sodium chloride, but not for the mentioned potassium-, magnesium- and calcium containing sulfate minerals. Only pure potassium sulfate can be granuled using press-granulation under specific circumstances (such as addition of some water or blasting of vapor).

Non-ductile salts, such as the above-mentioned sulfate minerals, are generally processed to granulate by roll granulation using pan granulators or granulation drums, wherein generally granulate auxiliaries and additives have to be added. Roll granulates are also usable spillable products, but show a generally different spillage-, mixture- and storage behavior as compared to press granulates, which has to be taken into account when mixing different single fertilizers (bulk blending). Furthermore, roll granulates require an additional thermal drying treatment.

OBJECT AND SUMMARY OF THE INVENTION

It is the object underlying the invention to provide a manufacturing process of granulated fertilizers via press granulation using sulfate-containing, non-ductile, finely grained to powder-like compounds, especially kieserite, polyhalide and arcanite as well as langbeinite as single components or in form of a mixture. In order to do so, the flowing properties and compactor behavior of the compounds or compound mixtures, which originally cannot be compacted or can only compacted under difficulties when using a roller press, have to be influenced so that stable foils are obtained under high pressure on the counter-rotating rollers, which do not disintegrate into fine grain due to mechanical stress during crushing in the impact mill, and which result in stable granulate grains in good to satisfactory yields with a desired grain size in between 1 to 5 mm, and which have similar form and mechanical properties as compared to those of press granulates of potassium chloride generally obtained by press-granulation.

It has been found that the insufficient ductility of specific mineral salts, especially magnesium-, calcium- and potassium-containing mineral salts, can be largely compensated by adding a viscous additive in form of sugar-containing by-product of the sugar cane or sugar beet production in an amount of from 1.5 to 8 mass % to the powder-like salt, which is to be compacted, followed by compacting using press rollers under usual press pressures. The present invention consequently provides the process according to claim 1. Preferred embodiments are listed in the dependent claims and are illustrated in the following description. Furthermore, the present invention provides the granulate obtained in accordance with the process of the present invention.

The essential method step of the process in accordance with the present invention is the mixing of salt and additive, as well as the compacting of said mixture using press rollers and pressures up to 300 bar, preferably 150 to 280 bar, in embodiments 200 to 250 bar. Typically, counter-rotating press rollers or compactor rollers are used. Preferably, the obtained product is afterwards transferred into a storage container, where the press scraps are stored without heating (at environmental temperature) for 1 to 6, preferably 2 to 5, more preferably 3 to 4 hours, in order to allow for a certain curing. The press scraps may be slightly crushed prior thereto. Saud storage reduces the occurrence of fine dust in the following method steps in order to obtain a granulate, and thus increases the yield of granulate with the desired grain size. After storage, the product is crushed using common methods, and is then classified using sieve processes with common apparatuses, in order to obtain the desired product.

The viscous additive to be used in accordance with the present invention is typically a mixture with a content of total sugar in the dry matter of 40 to 60% by mass, preferably 45 to 60% by mass, more preferably 47 to 55% by mass. Said additive is used in an amount of 1.5 to 8% by mass, preferably 2 to 5% by mass, more preferably 3 to 5% by mass, relative to the mixture of additive and salt to be pressed. Preferably, the additive is sugar cane molasses or sugar beet molasses with about 47 to 55% by mass total sugar in the dry matter. Particularly suitable are additives from 1 to 7 mass % sugar beet molasses or sugar cane molasses with about 47 to 55 mass % of total sugar in the dry matter.

Molasses, which accumulates as a residue or by-product in the sugar industry, is highly effective, as well as cost effective while being not critical for the environment. In addition to about 50% sugar, the molasses contains water-soluble non-sugar components, especially mineral components and NPN-compounds, potassium salts and higher molecular organic compounds (polysaccharides) and protein. The molasses can be directly added as a typical syrup-type compound to the powder-like salt or salt mixture in a mixer, whereby a heating of the molasses to about 30 to 40° C. aids a homogenous distribution of the additive with the salt. During the process, the temperature of the mixture of additive and salt should not be more than 25° C. following the aforementioned mixing step.

To obtain the desired effect by using additives on a sugar basis, especially original molasses for the compacting of non-ductile sulfate-containing salts using roller presses, so as to form stable salt foils (scraps) as well as impact crushing thereof using impact mills after a riping process via storage, resulting in stable products in form of typical press granules, can surprisingly not be derived from the fact that molasses was used previously as a binder for molds from casting sand or the use in the pelletizing of oar or anthracite fine.

DETAILED DESCRIPTION

The invention will be illustrated by examples.

Figure 1:
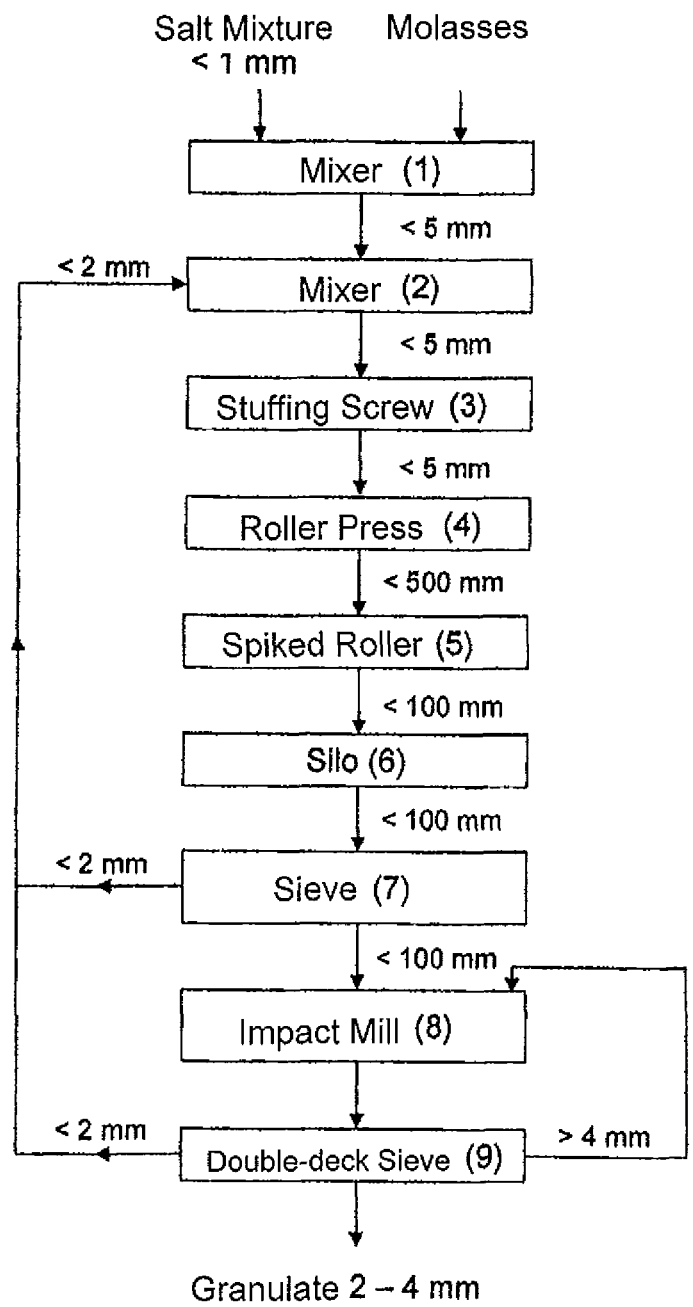
FIGS. 1-3 show flow diagrams of processes in accordance with the present invention.

Example 1 (see FIG. 1)

5 tons of a mixture of 70 parts kieserite, 22 parts langbeinite, 6 parts anhydride and 2 parts clay minerals with a grain size of 95%<1 mm are mixed with 180 kg sugar beet molasses with 47 to 50% total sugar content in the dry matter using a paddle mixer (1) until a homogenous distribution is obtained. Occasionally, agglomerates up to 5 mm are formed. The temperature of the mixture shall be <25° C. Said mixture is mixed in a second peddle or plough mixer (2) with fine grains from the product sieving which is fed back into the process, and is fed back into the pressing cycle. The material which has been pre-compressed in a stuffing screw (3) is fed into the roller press (4) with counter-rotating compacting rollers, and is compacted using pressures from 200 to 250 bar. An about 7 to 20 mm strong foil is obtained, which is continually formed next to small parts of non-pressed fine salt. Since the press scrubs are initially very soft, the mixture of scrubs and fine grains is pre-crushed using a spiked roller (5) into parts being at maximum 10×10 cm of size, stored in a Silo (6) for at least 3 to 4 hours, and afterwards the cured mixture is sieved using a sieve (7). The sieved, non-compounded fine salt is fed back into the press cycle, the pre-crushed press foil (scraps) is crushed as usual in an impact mill and fed to a double deck sieve (9).

Coarse grain from the screen overflow is fed back to the impact mill, medium grain from 2 to 4 mm is transferred via mechanical conveyors into the product silo. Undersized grain (fine product) is fed to the second mixer (2) and thus fed back into the press cycle.

In total, 5 tons fresh salt, 180 kg molasses and 4 to 8 tons circulation salt at first result in 10 to 12 tons pressed scraps and, due to their crushing, about 5,000 kg granulate. The solidity of the granules is on average about 10 to 15 Newton and increases during storage, since the amount of water of the added molasses is slowly bound by hydration reactions.

Figure 2:
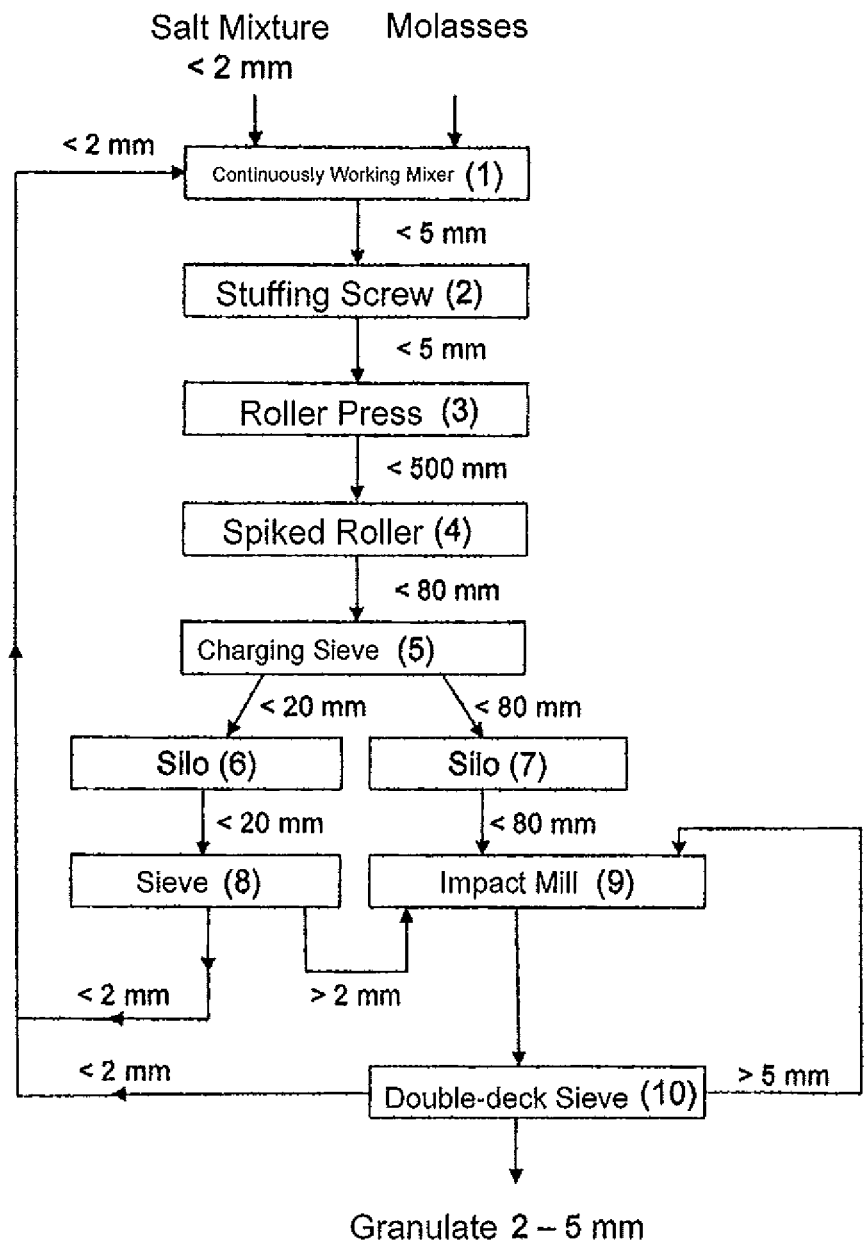
Figure 3:
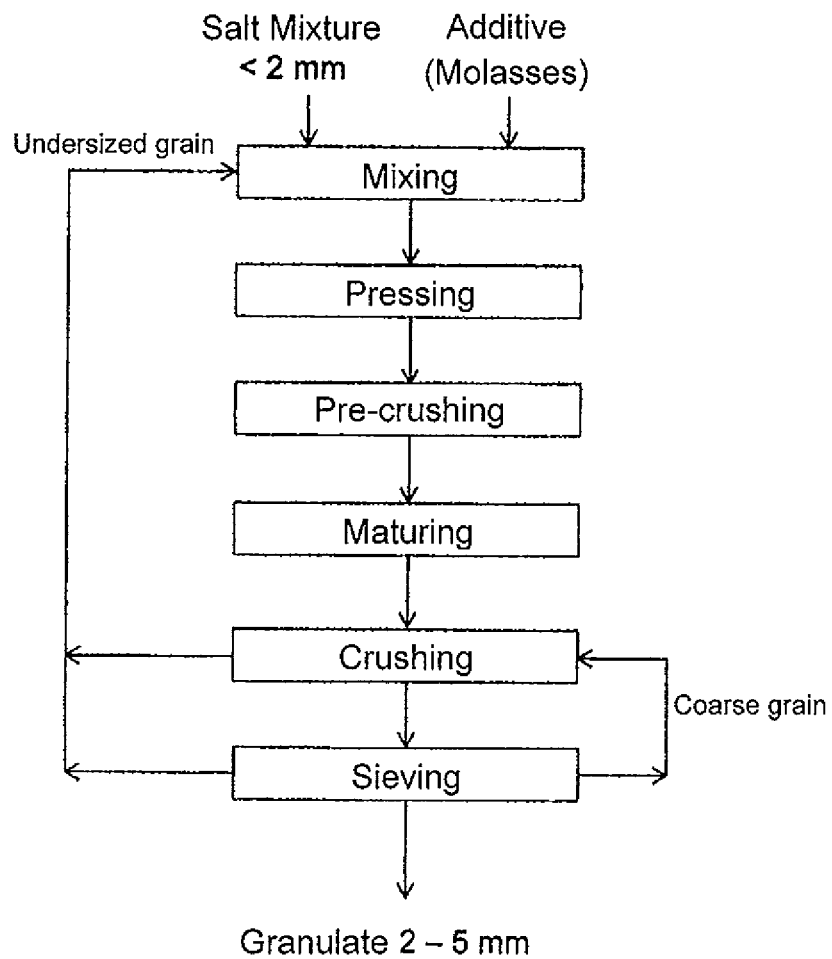

Example 2 (see FIG. 2)

20 tons of polyhalide ($K_2SO_4 \cdot MgSO_4 \cdot 2CaSO_4 \cdot 2H_2O$) from a natural resource is mixed with an additive of 4 to 4.6% by mass of sugar beet molasses and a total sugar amount of 47% in the dry matter. The mixture of the finely grained mineral salt with a grain size of 0 to 2 mm and the molasses occurs at environmental temperature in a continuously working mixer (1) in throughput. To said continuously working mixer (1), the sieved fine grain from the granulate sieving is added. Said mixture is fed to the press rollers of the roller press (3) via a stuffing screw (2), wherein press pressures up to 280 bar result at first in soft scraps, which, after pre-crushing in a spiked roller (4) is obtained in form of palm-sized parts. Said mixture, after passing a charging sieve (5) is separated into two streams. The screen underflow, which consists of non-pressed material and smaller scrap parts, is transferred into a separate maturing silo (6), the large scraps are transferred into a second silo (7). The maturing time in silo (6) should be about 3 to 4 hours, the maturing time in silo (7) should be about 5 to 8 hours. The discharge from the first silo (6) is transferred to a sieve (8) with a mesh size of 2 mm, the discharge from the second silo (7) together with the screen overflow of sieve (8) is directly charged into the impact mill (9) and afterwards to a double back sieve (10) for granulate sieving. In principle, the maturing goods via storage can be stored in open storage instead of silos.

Obtained are 20.5 to 21 tons of final granulate of 2 to 5 mm, which is transferred to the product silo. After about 1 day of storage time, the solidity of the granules is about 18 to 20 Newton.

The product is fit for storage, scatterable and essentially not dusting and is a potassium-magnesium-sulfur fertilizer with about 15% $K_2O$, 6% MgO and about 18% CaO as well as a total sulfur content of 20% S.

The invention claimed is:

1. A process for press-granulating of non-ductile salts and salt mixtures comprising adding a viscous additive in form of sugar-containing by-products of a sugar cane or sugar beet process in an amount of 1.5 to 8% by mass to a powder-like salt or salt mixture at pressures of up to 280 bar, mixing the powder-like salt or salt mixture with the viscous additive added thereto in one or a plural of mixers in series to form a homogenized mixture, and compacting the homogenized mixture in a press granulating process using at least one roller press.

2. The process for press-granulating of non-ductile salts and salt mixtures according to claim 1 wherein compacting the homogenized mixture forms pressed foils, and further comprising crushing the foils using at least one impact mill, sieving granulated grain of crushed material using a double deck sieve, and re-feeding of undersized and oversized grain into the at least one roller press and the at least one impact mill, respectively.

3. The process according to claim 2, further including pre-crushing said pressed foils and maturing the pressed foils for 3 to 8 hours, wherein crushing the pressed foils in the at least one impact mill and the step of sieving occurs after the step of maturing.

4. The process according to claim 3, wherein the step of maturing is carried out in silos or open storage.

5. The process according to claim 4, wherein the temperature of mixing, compacting and maturing is 20 to 40° C.

6. The process according to claim 1, further including pre-crushing undersized and oversized grain, separating the undersized and oversized grain after the step of pre-crushing, curing the oversized grain by maturing, and crushing the cured oversized grain in at least one impact mill.

7. The process according to claim 6, wherein the temperature of mixing, compacting and maturing is 20 to 40° C.

8. The process according to claim 1, wherein the non-ductile salts and salt mixture comprise one of kieserite, langbeinite, polyhalide, anhydride and arcanite.

* * * * *